United States Patent
Clark et al.

(10) Patent No.: US 8,983,938 B1
(45) Date of Patent: Mar. 17, 2015

(54) SELECTING A COMMAND FILE

(75) Inventors: Charles F. Clark, Roseville, CA (US); Paul T. Congdon, Granite Bay, CA (US); John R. Miles, El Dorado Hills, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1438 days.

(21) Appl. No.: 12/367,081

(22) Filed: Feb. 6, 2009

(51) Int. Cl.
*G06F 17/30* (2006.01)
*G06F 9/44* (2006.01)
*H04L 29/08* (2006.01)

(52) U.S. Cl.
CPC ............ *G06F 8/34* (2013.01); *H04L 29/08117* (2013.01)
USPC ........... 707/723; 707/735; 707/748; 707/608; 709/219; 709/223; 709/228; 711/103; 711/165; 711/170; 358/1.15; 358/1.16; 358/1.18; 710/8; 710/9; 710/10; 710/62; 717/124; 717/127

(58) Field of Classification Search
CPC ...................... H04L 29/08117; H04L 29/0809; H04L 43/50; H04L 24/00; H04L 4/02; G06F 8/34; G06F 8/65; G06F 21/6218; G06F 21/60; G06F 12/0246; G06F 3/0482; G06F 3/0484; G06F 3/04842; G06F 17/30091; G06F 3/04817; G06F 3/0487
USPC ......... 709/220, 221, 219, 222, 223, 228, 224; 711/103, E12.008, 165, 170; 707/723, 707/735, 748, 609, 758, 608, 80; 710/8, 9, 710/10, 62; 717/124, 127, 106, 114, 134; 358/1.16, 1.15, 1.8, 1.14, 1.18, 1.9, 1.5
See application file for complete search history.

(56) References Cited

U.S. PATENT DOCUMENTS

| | | | | |
|---|---|---|---|---|
| 5,561,812 A * | 10/1996 | Ravaux et al. | ............... | 709/250 |
| 6,920,555 B1 * | 7/2005 | Peters et al. | ................. | 713/100 |
| 7,403,987 B1 * | 7/2008 | Marinelli et al. | ............ | 709/223 |
| 7,755,787 B2 * | 7/2010 | Eng et al. | ..................... | 358/1.15 |
| 2003/0177208 A1 * | 9/2003 | Harvey, IV | ................... | 709/221 |
| 2003/0217138 A1 * | 11/2003 | Shimba et al. | ................ | 709/223 |
| 2004/0044912 A1 * | 3/2004 | Connary et al. | ............. | 713/201 |
| 2004/0210345 A1 * | 10/2004 | Noda et al. | .................... | 700/245 |
| 2005/0257183 A1 * | 11/2005 | Lo et al. | .......................... | 707/6 |
| 2006/0218370 A1 * | 9/2006 | Satoyama et al. | ............ | 711/170 |
| 2006/0277226 A1 * | 12/2006 | Chikusa et al. | ............... | 707/201 |
| 2007/0055840 A1 * | 3/2007 | Yamamoto et al. | ........... | 711/165 |
| 2007/0156710 A1 * | 7/2007 | Kern et al. | .................... | 707/100 |

(Continued)

OTHER PUBLICATIONS

Bilan Zhu and Masaki Nakagawa—"Information encoding into and decoding from dot texture for active forms"—Proceeding DocEng '03 Proceedings of the 2003 ACM symposium on Document engineering Nov. 20-22, 2003—pp. 105-114.*

(Continued)

*Primary Examiner* — Anh Ly

(57) ABSTRACT

A method for selecting a command file is described. One or more command files coupled with a first device are accessed. Each command file of the one or more command files comprises one or more command file attributes. One or more device attributes associated with a second device are accessed. The one or more command file attributes and the one or more device attributes are compared to determine a correlation between the one or more command files and the second device. Based on the comparing, generating a ranked portion of the one or more command files according to the correlation.

20 Claims, 4 Drawing Sheets

(56) References Cited

U.S. PATENT DOCUMENTS

| | | | | |
|---|---|---|---|---|
| 2007/0204119 A1* | 8/2007 | Murotani et al. | | 711/161 |
| 2008/0270697 A1* | 10/2008 | Ueoka et al. | | 711/114 |
| 2009/0100215 A1* | 4/2009 | Nochimowski | | 711/103 |
| 2009/0248696 A1* | 10/2009 | Rowles et al. | | 707/10 |
| 2009/0323568 A1* | 12/2009 | Hoffmann et al. | | 370/310 |
| 2010/0070684 A1* | 3/2010 | Chu et al. | | 711/103 |
| 2010/0250726 A1* | 9/2010 | Moses et al. | | 709/224 |
| 2010/0293048 A1* | 11/2010 | Singolda et al. | | 705/14.43 |

OTHER PUBLICATIONS

Sheldon Teelink and Robert F Erbacher—"Improving the computer forensic analysis process through visualization"—Magazine Communications of the ACM—Next-generation cyber forensics—vol. 49 Issue 2, Feb. 2006 pp. 71-75.*

* cited by examiner

200

```
┌─────────┐
│  Start  │
└────┬────┘
     ▼
```

Access one or more command files coupled with a first device, each command file of the one or more command files comprising one or more command file attributes.
205

Access one or more device attributes associated with a second device.
210

Compare the one or more command file attributes and the one or more device attributes to determine a correlation between the one or more command files and the second device.
215

Based on said comparing, generate a ranked portion of the one or more command files according to the correlation.
220

```
┌─────────┐
│   End   │
└─────────┘
```

FIG. 2

SELECTING A COMMAND FILE

FIELD

The field of the present invention relates to computing systems. More particularly, embodiments of the present invention relate to command files.

BACKGROUND

Computers are widely used today to perform a variety of functions. Generally, computers need to be frequently configured to account for upgrades and modifications in existing technology. There exist many ways to configure computer systems.

In one example, a console may be attached to a computer system and an operator may enter the configuration information at the console prompt. In another example, the computer system to be configured is attached to a network. A computer system may acquire an IP address through dynamic host configuration protocol (DHCP) and then use simple network management protocol (SNMP) to remotely configure the computer system. In yet another example of configuring a computer system, a storage device is devoted to a single configuration auto-run command.

However, there exist many limitations as to the current state of technology with respect to configuring a computer system. For example, configuring multiple computer systems requires having multiple mass storage devices with different configuration instructions thereon. In the alternative, an auto-run command must be changed for each computer system configuration attempt. Hence, current methods for configuring a computer system are time-consuming, wasteful, and thus costly.

BRIEF DESCRIPTION OF THE DRAWINGS

The accompanying drawings, which are incorporated in and form a part of this specification, illustrate embodiments of the present technology for selecting a command file, together with the description, serve to explain principles discussed below:

FIG. 2 is a flowchart of an example method for selecting a command file, in accordance with embodiments of the present technology.

Figure 1:
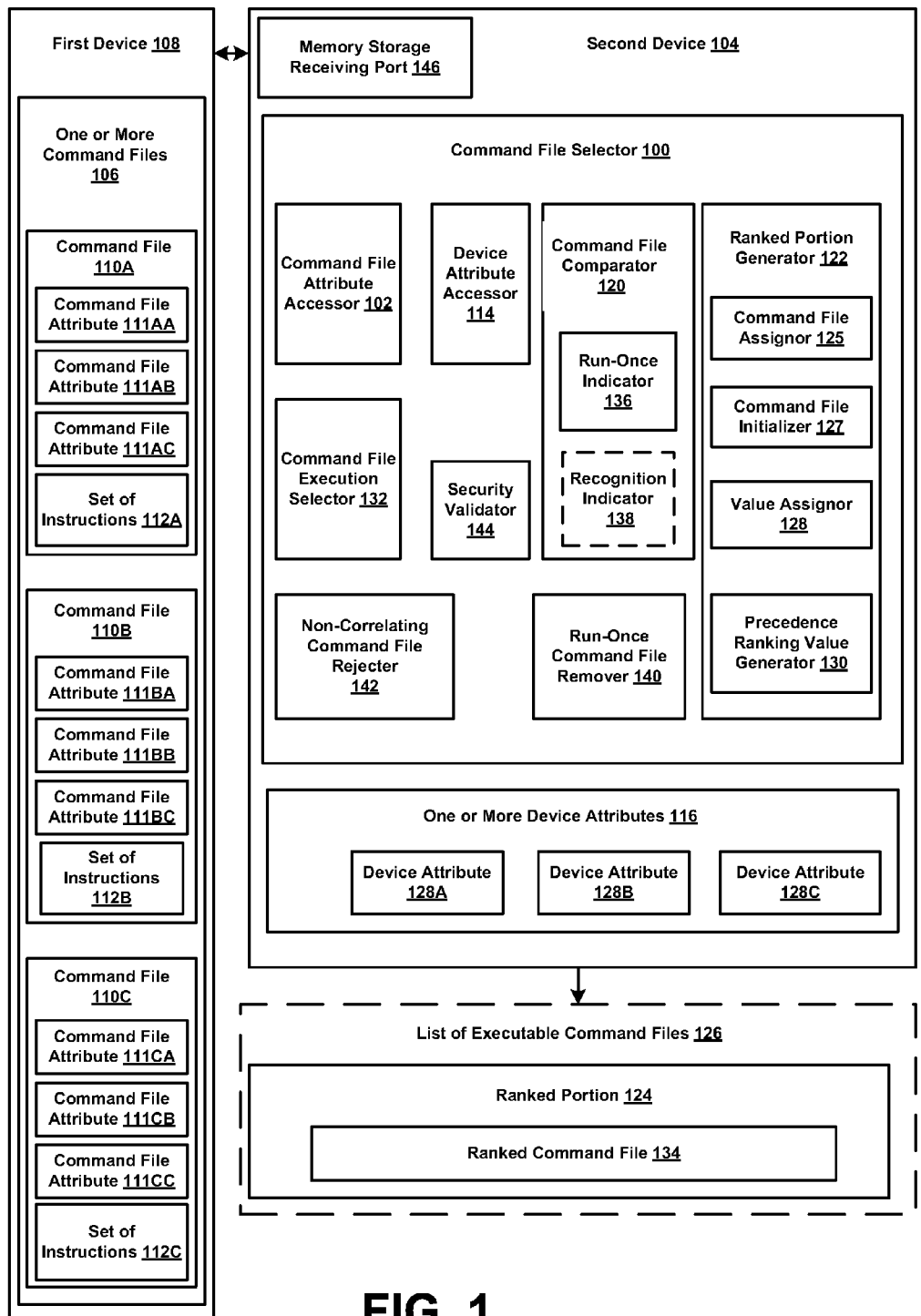
FIG. 1 is a block diagram of an example command file selector, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "comparing", "generating", "assigning", "selecting", "placing", "recognizing", "rejecting", "removing", "initializing", "validating", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Example Command File Selector-Overview

Embodiments in accordance with the present technology pertain to a command file selector for enabling the utilization of one storage device to deploy executable command files to multiple devices. With all of these executable command files located on one device, embodiments of the present technology utilize a command file selection process to insure that each command file is run on the device or devices for which it is intended. Embodiments of the present technology utilize command file attributes and device attributes to select the appropriate executable command file or files for each device.

This method of selecting an executable command file from a mass storage device comprising executable command files decreases the need for a user to keep track of multiple devices on which each executable command file is targeted to run. Furthermore, when one device is finished executing a command file, the mass storage device may be moved to the next device for processing. This inter-device movement of a single mass storage device enables the conservation of resources.

More particularly, an example device such as a network switch may be utilized in illustrating one embodiment of the present technology. Take the example in which a customer desires that network switch "A" be updated with a new configuration. In accordance with embodiments of the present technology, a command file selector is coupled with network switch "A". A universal serial bus (USB) flash drive is plugged into a USB connector port of network switch "A". The USB flash drive comprises one or more command files, wherein each command file comprises one or more command file attributes and a set of instructions directed to one or more devices, such as network switch "A".

In one embodiment, the command file selector accesses the command file attributes within each command file on the USB flash drive. The command file selector reads the USB flash drive, and performs a security check by validating each command file. The command file selector also accesses the device attributes of network switch "A". The command file selector compares the command file attributes of each command file on the USB flash drive with the device attributes of network switch "A".

If a command file has a command file attribute that is inconsistent with the device attributes of network switch "A", then that command file is considered to be non-correlating with network switch "A" and is removed from consideration for execution. For example, if network switch "A" has a family name of "3000" and command file attributes of the command file are targeted for a network switch having a family name of "4000", then the command file is considered to be non-correlating with network switch "A". The command file targeting the network switch having a family name of "4000" is then removed from consideration for execution.

However, if all of the command file attributes are consistent with the device attributes of network switch "A", then the command file is considered to be correlating with network switch "A" and is added to a list of executable command files. For example, if the command file selector finds that command file attributes and any portion thereof comprising a command file is targeted towards device attributes of network switch "A" with a family name of "3000", then a correlation between the command file and network switch "A" is found to exist. Subsequently, this correlating command file is then placed in a store of executable command files.

Then, each command file attribute of the command file correlating with network switch "A" is assigned a value. This value may be pre-determined by the manufacturer and/or determined by a customer. A higher value is assigned to a command file attribute that is more specific to network switch "A". It should be appreciated that each command file may include several command file attributes correlating with network switch "A".

The values assigned to each command file attribute of each correlating command file are then summed. Next, the command files are precedence ranked according to the values of their summed command file attributes. For example, a higher ranking command file takes precedence over a lower ranking command file in being selected for execution.

In one embodiment, the command file with the highest value of the summed command file attributes is selected for execution. In another embodiment, if a value of the summed command file attributes of a correlating command file is tied with the values of the summed command file attributes of two or more other correlating command files, then the command file that is listed first in the precedence ranking is selected for execution first. In yet another embodiment, suppose that the value of the summed command file attributes of a correlating command file is tied with the values of the summed command file attributes of two or more other correlating command files and one of these tied correlating command files has run-once instructions. Then, the correlating command file that is listed first in the precedence ranking and has the run-once instructions is selected for execution first.

By comparing the command file attributes of each command file in a USB flash drive with the device attributes of network switch "A", the command file selector generates a precedence ranking of the one or more correlating command files. This precedence ranking is utilized to select a command file for execution. Additionally, a command file selector may be used to update another device, such as network switch "B", by selecting for execution a command file "X" that correlates with the device attributes of network switch "B". Command file "X" is located on the same USB flash drive that harbored the selected executable command file for network switch "A".

Thus, embodiments of the present technology enable the utilization of a single USB flash drive comprising multiple command files thereon to serially configure multiple network switches. Additionally, embodiments of the present technology may be utilized for activities such as, but not limited to, troubleshooting and test execution.

Example Architecture of Command File Selector

FIG. 1 is a block diagram of an example command file selector (CFS) 100, in accordance with embodiments of the present technology. CFS 100 includes a command file attribute accessor 102, device attribute accessor 114, command file comparator 120, and ranked portion generator 122. In further embodiments, CFS 100 includes run-once command file remover 140, command file execution selector 132, non-correlating command file rejecter 142, and security validator 144.

Referring still to FIG. 1, in one embodiment, command file comparator 120 includes run-once indicator 136 and recognition indicator 138. In one embodiment, ranked portion generator 122 includes command file assignor 125, command file initializer 127, value assignor 128, and precedence ranking value generator 130. According to one embodiment, a run-once indicator 136 is referred to as a "run-once flag."

In one embodiment, command file selector 100 is coupled with second device 104. In one embodiment, second device 104 includes memory storage receiving port 146 and one or more device attributes 116, such as device attribute 128A, device attribute 128B, and device attribute 128C (device attributes 128A-128C). For purposes of illustration, as well as brevity and clarity, only device attributes 128A-128C are shown in FIG. 1. However, it is appreciated that CFS 100 may include more or less device attributes than device attributes 128A-128C.

FIG. 1 shows CFS 100 accessing one or more command files 106 coupled with first device 108. Command file 110A, command file 110B, and command file 110C (command files 110A-110C) include set of instructions 112A, set of instructions 112B, and set of instructions 112C (set of instructions 112A-112C), respectively. For purposes of illustration, as well as brevity and clarity, only command files 110A-110C and set of instructions 112A-112B are shown in FIG. 1. However, it is appreciated that CFS 100 may include more or less command files and sets of instructions than command files 110A-110C and set of instructions 112A-112C. Set of instructions 112A-112C comprise commands that are executable by second device 104.

Command file 110A also includes command file attribute 111AA, command file attribute 111AB, and command file attribute 111AC (command file attributes 111AA-111AC). Command file 110B also includes command file attribute 111BA, command file attribute 111BB, and command file attribute 111BC (command file attributes 111BA-111BC). Furthermore, command file 110C also includes command file attribute 111 CA, command file attribute 111 CB, and command file attribute 111CC (command file attributes 111CA-111CC). For purposes of illustration, as well as brevity and clarity, only command files attributes 111AA-111AC, command file attributes 111BA-111BC, and command file attributes 111CA-111CC are shown in FIG. 1. However, it is appreciated that CFS 100 may include more or less command files attributes than command file attributes 111AA-111AC, command file attributes 111BA-111BC, and command file attributes 111CA-111CC.

Command file attributes 111AA-111AC, 111BA-111BC, and 111CA-111CC of command files 110A, 110B, and 110C, respectively, reference device attributes of one or more devices upon which each command file 110A, 110B, and 110C is to be executed.

FIG. 1 also shows CFS 100 generating ranked portion 124. Ranked portion 124 includes ranked command file 134. Additionally, in one embodiment, ranked portion 124 is located within list of executable command files 126. List of executable command files 126, in one embodiment, is coupled with but external to CFS 100. In another embodiment, list of executable command files 126 is internal to CFS 100. In yet another embodiment, ranked portion 124 is coupled with but external to list of executable command files 126.

In one embodiment, the command files 110A-110C of FIG. 1 are separate and configured via set of instructions 112A-112C to provide commands to be executed to a device or devices, such as second device 104. Second device 104 may be any device capable of being configured by a command file, such as but not limited to a network switch. Second device 104 may include memory storage receiving port 146 for receiving first device 108.

In one embodiment, memory storage receiving port 146 may be, but is not limited to being, a USB port coupled with second device 104. In one embodiment, first device 108 is a memory storage configured to be received by memory storage receiving port 146 of second device 104. For example, first device 108 may be, but is not limited to being, a USB flash drive. First device 108 is a command file store that stores configuration commands, such as command files 110A-110C.

In one embodiment, FIG. 1 shows CFS 100 coupled with one or more device attributes 116 via second device 104. Device attributes 128A-128C are features that are specific to a device. For example, a device attribute may be, but is not limited to, the following: a device's serial number, a device's base media access control (MAC) address, a device's management IP address, a device's software version, a device's product name, a device's product family, and a device's manufacturer. All of these attributes are accessible programmatically. Of note, command file attributes are capable of comprising the same content that device attributes comprise. For example, if a command file attribute is programmed to be executed on a device whose device attribute specifies a product family of "8000", the command file attribute would specify the product family of "8000".

Also of note, three of the above listed device attributes, serial number, base MAC address, and management IP address, can uniquely identify the device. Four of the above listed device attributes, software version, product name, product family, and manufacturer, can only identify a family or group of which the device is one.

In embodiments of the present technology, each command file attribute is assigned a value based upon its position within a hierarchy of command file attributes, ranked from the most specific to the least specific relevant to second device 104. For example, a device's serial number is the most specific identification for that device of the above listed device attributes. Therefore, the command file attribute of a serial number is given the greatest value. Likewise, a device's manufacturer is the least specific identification of that device of the above listed device attributes. Therefore, the command file attribute of a manufacturer is given the smallest value.

In one embodiment, of the above listed device attributes, the hierarchy from the most specific to the least specific device attributes is the following: serial number, MAC address, management IP address, software version, product name, product family, and manufacturer. Likewise, the command file attributes contain the same hierarchy as the device attributes.

In other words, higher values (e.g. scores, a visual representation corresponding to a value, etc.) are given to the more specific command file attributes, while lower values (e.g. scores, a visual representation corresponding to a value, etc.) are given to the less specific command file attributes. Additionally, assume a list of device attributes, "C", "D", "E", and "F", are ranked from least specific to second device 104 to more specific to second device 104. The sum of the values assigned to one or more lesser specific attributes to second device 104, "C", "D", and "E", must be less than any value assigned to any attribute more specific to second device 104, "F".

For example, suppose that device attributes and command file attributes have the following values: a serial number has a value of 64, a base MAC address has a value of 32, a management IP address has a value of 16, a software version has a value of 8, a product name has a value of 4, a product family has a value of 2, and a manufacturer has a value of 1. The sum of the values of the base MAC address, the management IP address, the software version, the product name, the product family, and the manufacturer must be less than the value of the serial number. The sum of the values of the base MAC address, the management IP address, the software version, the product name, the product family, and the manufacturer equals 63. As can be seen, the value of the sum of the lesser specific command file attributes, 63, is less than the value of the serial address, which is 64.

Example Operation of a Command File Selector

More generally, in embodiments in accordance with the present technology, CFS 100 is utilized to deploy command files to multiple devices by putting all of the command files on a single mass storage device. CFS 100 uses device attributes to select the appropriate command file or files for each device. This is advantageous because it reduces the need for customers to keep track of the relationship between multiple storage devices and the devices on which they run, thereby conserving resources such as time and money.

Referring to FIG. 1, in one embodiment, command file attribute accessor 102 accesses one or more command files coupled with a first device, wherein each command file of the one or more command files comprises one or more command file attributes. For example, command file attribute accessor 102 accesses one or more command files 106 coupled with first device 108. Each command file 110A, 110B, and 110C of one or more command files 106 comprises command file attributes 111AA-111AC, 111BA-111BC, and 111CA-111CC, respectively.

Referring to FIG. 1, in one embodiment, device attribute accessor 114 accesses one or more device attributes associated with a second device. For example, device attribute accessor 114 accesses one or more device attributes 116 associated with second device 104.

Referring still to FIG. 1, in one embodiment, command file comparator 120 compares one or more command file attributes 106 and one or more device attributes 116 to determine a correlation between one or more command files 106 and second device 104. Take the example in which the only command file coupled with first device 108 is command file 110A. Command file 110A comprises the following: command file attribute 111AA being a product name "3200", command file attribute 111AB being a product family "3000", and command file attribute 111AC being a device manufacturer "H". Furthermore, device attribute 128A is product name "3200", and device attribute 128B is product family "3000". The command file attributes are compared with device attributes to find a match, or in other words, a correlation. Since all command file attributes correlate with all device attributes, this comparison yields a result that command file 110A correlates with device 104.

In one embodiment, run-once indicator 136 generates a recognition indicator of a command file of the one or more command files 106 comprising a run-once set of instructions. For example, run-once indicator 136 generates a recognition indicator 138 of a command file 110A of one or more command files 106. In this example, command file 110A comprises a run-once set of instructions.

In one embodiment, the term "run-once" associated with command file 110A refers to a command file with set of instruction 112A instructing second device 104 to run command file 110A only once. For example, there may be five command files that are all specific to second device 104. Each one of these five command files includes a set of instructions that is marked as run-once. Even though each of the five command files has a unique address, all five sets of instructions comprising the five command files are identical in functionality. In response to the set of instructions to run-once command file 110A, second device 104 chooses one of the five command files to execute. In one embodiment, the one of the five command files is chosen randomly. Recognition indicator 138 may be any sort of mark, such as but not limited to, an audio and/or visual indication.

Referring still to FIG. 1, in one embodiment, non-correlating command file rejecter 142 rejects a non-correlating portion of one or more command files 106, based on the comparing performed by command file comparator 120. In other words, the non-correlating portion of one or more command files 106 and the command file attributes therein does not correlate with one or more device attributes 116 of second device 104.

Furthermore, if any device attribute of one or more device attributes 116 does not correlate with a command file of one or more command files 106, then that command file and the command file attributes therein that does not correlate with any device attributes 128A-128C of second device 104 is rejected.

Referring still to FIG. 1, in one embodiment, ranked portion generator 122 generates ranked portion 124 of the one or more command files 106 according to the correlation determined by command file comparator 120. Ranked portion 124 of one or more command files 106 may be all of the one or more command files 106 or any number of command files therein. Ranked portion 124 refers to the portion of one or more command files 106 being ranked in an order from most specific relevant to second device 104 to least specific relevant to second device 104, or vice versa.

In one embodiment, referring still to FIG. 1 and as described herein, ranked portion generator 122 includes command file assignor 125, command file initializer 127, value assignor 128, and precedence ranking value generator 130. Command file assignor 125 places in a list of executable command files 126 a visual representation of a command file of one or more command files 106 that correlate with one or more device attributes 116. List of executable command files 126 comprises one or more command file candidates for execution. The candidates for execution are those command files whose command file attributes correlate with the device attributes and thus are selectable for execution by being placed in the list of executable command files 126. Additionally, in one embodiment, the visual representation is a virtual representation of a command file.

Command file initializer 127 initializes each command file of ranked portion 124 to have a pre-determined initial value. In one embodiment, the pre-determined initial value is zero. However, it is appreciated that the pre-determined initial value may be something other than zero.

In one embodiment, value assignor 128 assigns one or more pre-determined values to one or more command value attributes, such as command file attributes 111AA-111AC. For example, command file 110A may comprise command file attributes 111AA-111AB targeted towards second device 104 that has a device attribute 128A of a product name of "6200", and device attribute 128B of a product family of "6000". Command file attribute 111AA of first device 108 is the product name of "6200". Command file attribute 111AB of first device 108 is the product family of "6000". Since every command file attribute correlates with device attributes 128A and 128B, a pre-determined value is assigned to the two command file attributes 111AA and 111AB having the product name "6200" and the product family "6000", respectively. The pre-determined value of four is assigned to the product name command file attribute 111AA and the pre-determined value of two is assigned to the product family command file attribute 111AB.

In the same example, command file 110B may include a command file attributes 111BA and 111BB targeted towards a second device 104 that has a device attribute 128A of product name "6200", and a device attribute 128B of manufacturer "Q". Command file attribute 111BA of first device 108 is the product name "6200". Command file attribute 111BB of first device 108 is the manufacturer "Q". Since every command file attribute correlates with device attributes 128A and 128B, a pre-determined value is assigned to the two command file attributes, command file attribute 111BA of the product name "6200" and command file attribute 111BB of the manufacturer "Q". The pre-determined value of four is assigned to the product name command file attribute 111BA and the pre-determined value of one is assigned to the manufacturer command file attribute 111BB.

Referring to FIG. 1, in one embodiment, precedence ranking value generator 130 generates ranked portion 124 of one or more command files 106 according to the correlation found by command file comparator 120. In the above example, the one or more pre-determined values assigned to correlating command file attributes 111AA and 111AB, values four and two, are summed to get the precedence ranking value of six. Likewise, the one or more pre-determined values assigned to correlating command file attributes 111BA and 111BB, values four and one, and are summed to get the precedence ranking value of five.

The command files 110A and 110B are then placed in order according to each command file's 110A and 110B precedence ranking value. For example, since command file 110A has a higher precedence ranking value than command file 110B, command file 110A will occupy a higher position in ranked portion 124, demarked in FIG. 1 as ranked command file 134. It is appreciated that in another embodiment, ranked command file 134 may be occupying the lowest position in ranked portion 124. In yet another embodiment, ranked command file 134 may occupy a position between the highest position and the lowest position in ranked portion 124.

Referring to FIG. 1, in one embodiment, execution selector 132 selects for execution ranked command file 134 of ranked portion 124. In one embodiment, a highest ranking command file of ranked portion 124 is selected for execution based on the precedence ranking value described herein. In another embodiment, if two or more command files are equally ranked in ranked portion 124, a command file of the two or more command files that is listed first in ranked portion 124 is executed. For example, if command file 110A is listed first in ranked portion 124 and command file 110A and command file 110B both have a precedence ranking value of seven, then command file 110A will be selected for execution since it is ranked first.

In another embodiment, if two or more command files are equally ranked in ranked portion 124, a command file that is associated with run-once instructions is selected for execution first. In yet another embodiment, a command file associated with run-once instructions may instruct second device 104 to restart the command selection process after executing a run-once command file that has been moved out of consideration for execution, as is discussed below. In this case, after second device 104 is restarted, another command file may be selected to be executed. This method can be used to upgrade software when old software will not accept a new configuration command file. For example, a first command file may instruct second device 104 to execute an upgrade to an installed software program, and then restart. The next command file accessed by second device 104 instructs second device 104 to load the new configuration command file that the upgraded software now accepts.

In one embodiment, if a command file is recognized as a run-once command file, then run-once command file command file remover 140 removes a visual representation of the command file from ranked portion 124 such that the command file is a non-candidate for execution, wherein this removing occurs after a run-once command file is recognized as a run-once command file, selected for execution, and executed. For example, if command file 110C is recognized as a run-once command file, then after command file 110C is selected for execution and executed, run-once command file remover 140 removes command file 110C from the list of executable command files 126. It should be noted that run-once indicator 136 performs a method of recognizing a run-once command file. However, other methods of recognizing a run-once command file are available, either manually or programmatically. Removing command file 110C from list of executable command files 126 eliminates command file 110C as a candidate for execution. In another embodiment, command file 110C is removed to a directory of completed command files. This directory of completed command files is a store of command files that has been removed from consideration as a command file to execute.

Referring still to FIG. 1, in one embodiment, security validator 144 validates one or more command files 106. This validation occurs before the command file comparator 120 compares one or more command files 106 and one or more attributes 116 of second device 104. For example, second device 104 accesses command file 110A and properly authenticates one or more command files 106 via standard technology in the art of authentication.

Referring now to 200 of FIG. 2, a flowchart of an example computer-implemented method for selecting a command file, in accordance with embodiments of the present technology is shown.

Referring to 205 of FIG. 2 and as described herein, in one embodiment of the present technology, one or more command files 106 coupled with first device 108 is accessed, each command file 110A-110C of the one or more command files 106 comprising command file attributes 111AA-111AC, 111BA-111BC, and 111CA-111CC, respectively.

Referring to 210 of FIG. 2 and as described herein, in one embodiment of the present technology, one or more device attributes 116 associated with second device 104 is accessed.

Referring to 215 of FIG. 2 and as described herein, in one embodiment of the present technology, one or more command file attributes 111AA-111AC, 111BA-111BC, and 111CA-111CC and the one or more device attributes 116 are compared to determine a correlation.

Referring to 220 of FIG. 2 and as described herein, in one embodiment of the present technology, based on the comparing of 215 of FIG. 2, ranked portion 124 of one or more command files 106 is generated according to the correlation.

Figure 3:
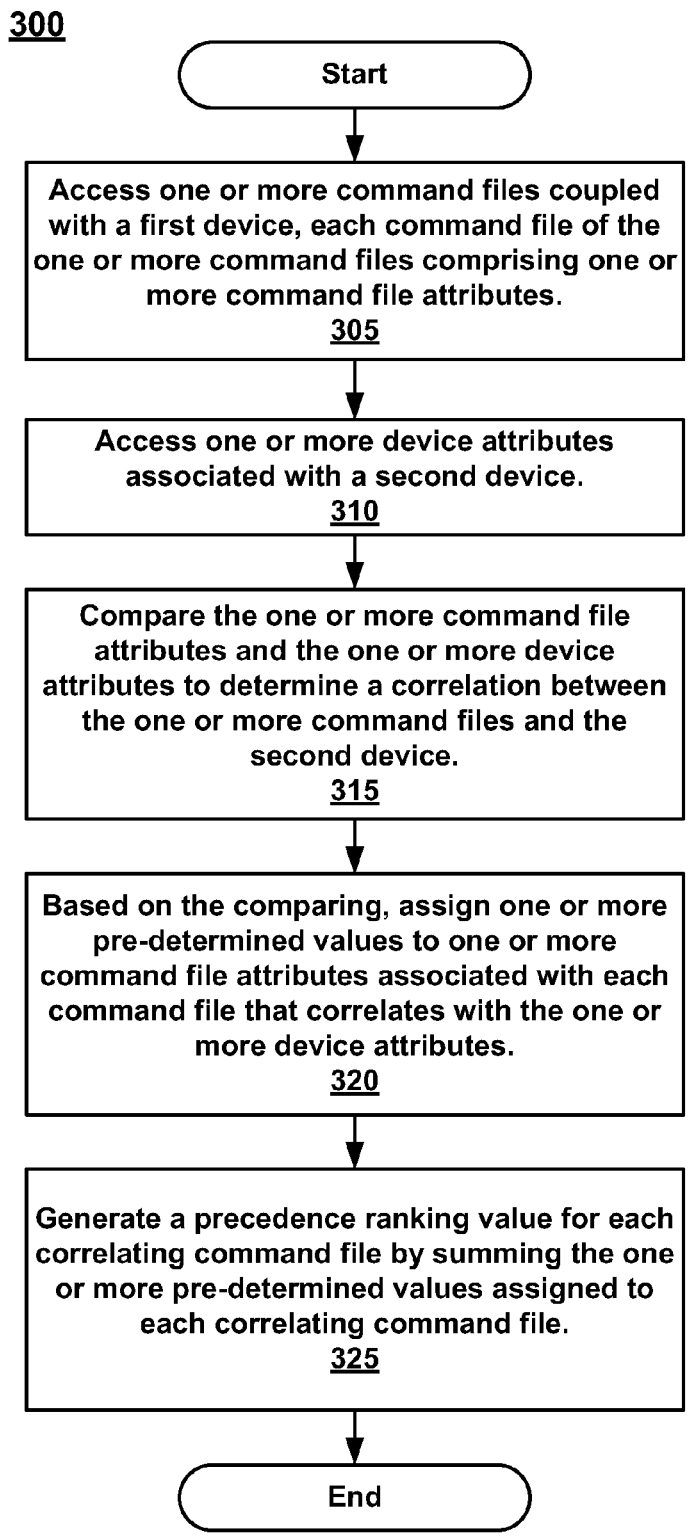
FIG. 3 is a flowchart of an example method for selecting a command file, in accordance with embodiments of the present technology.

FIG. 3 is a flowchart of an example method for selecting a command file, in accordance with embodiments of the present technology. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 300 is performed by CFS 100 of FIG. 1. According to one embodiment, a data storage feature is referred to as a computer usable storage medium.

Referring to 305 of FIG. 3, in one embodiment and as described herein, one or more command files 106 coupled with first device 108 is accessed, wherein each command file of one or more command files 106 comprises one or more command file attributes 111AA-111AC, 111BA-111BC, and 111CA-111CC.

Referring to 310 of FIG. 3, in one embodiment and as described herein, one or more device attributes 116 associated with second device 104 is accessed.

Referring to 315 of FIG. 3, in one embodiment and as described herein, one or more command file attributes 111AA-111AC, 111BA-111BC, and 111CA-111CC and one or more device attributes 116 are compared to determine a correlation between one or more command files 106 and second device 104.

Referring to 320 of FIG. 3, in one embodiment and as described herein, based on the comparing of 315, one or more pre-determined values is assigned to one or more command file attributes 111AA-111AC, 111BA-111BC, and 111CA-111CC that correlates with one or more device attributes 116.

Referring to 325 of FIG. 3, in one embodiment and as described herein, a precedence ranking value for each correlating command file is generated by summing the one or more pre-determined values assigned to each correlating command file.

Thus, embodiments of the present technology enable more than one auto-run command file to be positioned on a single mass storage device such that each auto-run command file will only be selected for execution on a device or devices for which they are targeted. Additionally, the run-once feature enables multiple command files to be executed on a single device. When execution is finished on one device and with the assistance of CFS 100, the mass storage device may be moved to another device intended for command file execution.

Example Computer System Environment

Figure 4:
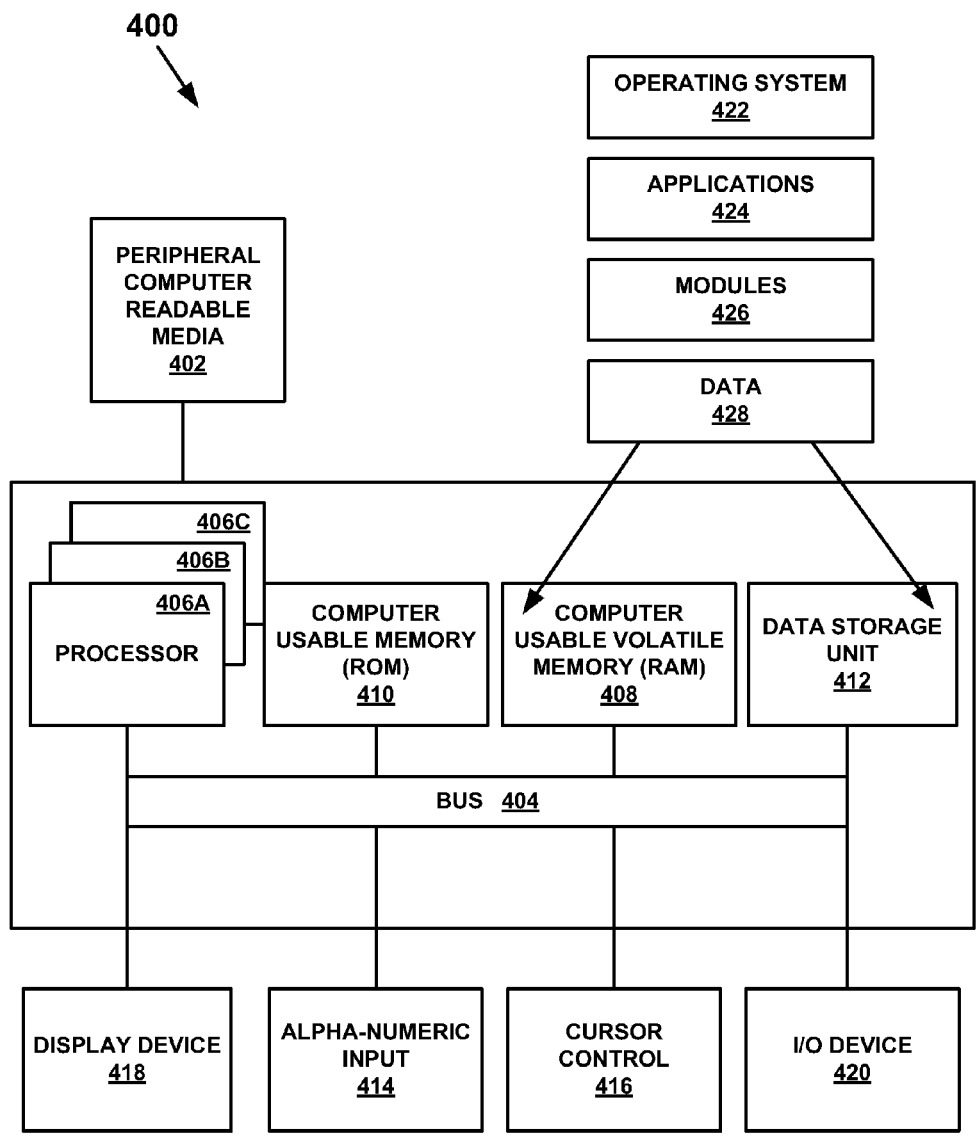
FIG. 4 is a diagram of an example computer system enabling a selecting of a command file, in accordance with embodiments of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a compact disc, and the like coupled therewith.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present invention, for example, is stored as an application 424 or module 426 in memory locations within RAM 408 and memory areas within data storage unit 412.

Computing system 400 is only one example of a suitable computing environment and is not intended to suggest any limitation as to the scope of use or functionality of embodiments of the present technology. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for selecting a command file, said method comprising:
   accessing, by one or more processors, one or more command files coupled with a first device, each command file of said one or more command files comprising one or more command file attributes;
   accessing, by the one or more processors, one or more device attributes associated with a second device;
   comparing, by the one or more processors, said one or more command file attributes and said one or more device attributes to determine a correlation between said one or more command files and said second device; and
   based on said comparing, generating a ranked portion of said one or more command files according to said correlation.

2. The method of claim 1, wherein said generating a ranked portion comprises:
   assigning one or more pre-determined values to one or more command file attributes associated with said each command file that correlates with said one or more device attributes; and
   generating a precedence ranking value for each correlating command file by summing said one or more pre-determined values assigned to said each correlating command file.

3. The method of claim 2, further comprising:
   selecting for execution a ranked command file of said ranked portion based on said precedence ranking value.

4. The method of claim 3, further comprising:
   selecting for execution a highest ranking command file of said ranked portion.

5. The method of claim 3, further comprising:
   if two or more command files are equally ranked in said ranked portion, selecting for execution a command file of said two or more command files that is listed first in said ranked portion.

6. The method of claim 1, further comprising:
   placing in a list of executable command files a visual representation of a command file of said one or more command files that correlates with said one or more device attributes.

7. The method of claim 1, wherein said comparing comprises:
generating a run-once flag on a command file of said one or more command files comprising run-once instructions.

8. The method of claim 3, further comprising:
recognizing a command file of said one or more command files as a run-once command file; and
after said run-once command file is executed, removing said run-once command file from said ranked portion such that said command file is a non-candidate for execution.

9. The method of claim 1, further comprising:
based on said comparing, rejecting a non-correlating portion of said one or more command files, wherein said non-correlating portion does not correlate with said one or more command file attributes.

10. A command file selector comprising:
one or more processors; and
a memory storing machine readable instructions, which when executed by the one or more processors cause:
a command file accessor coupled with a second device to access one or more command files coupled with a first device, each command file of said one or more command files comprising one or more command file attributes;
an attribute accessor to access one or more device attributes associated with a second device;
a command file comparator to compare said one or more command file attributes and one or more device attributes to determine a correlation between said one or more command files and said second device; and
a ranked portion generator to generate a ranked portion of said one or more command files according to said correlation.

11. The command file selector of claim 10, wherein said ranked portion generator comprises:
a command file assignor to place in a list of executable command files a visual representation of a command file of said one or more command files that correlate with said one or more device attributes;
a command file initializer to initialize said each command file of said ranked portion to have a pre-determined initial value;
a value assignor to assign one or more pre-determined values to one or more command file attributes of each correlating command file; and
a precedence ranking value generator to generate said ranked portion for said each correlating command file by summing said one or more pre-determined values assigned to said each correlating command file.

12. The command file selector of claim 11, wherein said pre-determined initial value is zero.

13. The command file selector of claim 10, further comprising:
an execution selector configured for selecting for execution a ranked command file of said ranked portion.

14. The command file selector of claim 10, wherein said command file comparator comprises:
a run-once indicator to generate a recognition indicator of a command file of said one or more command files comprising a run-once set of instructions.

15. The command file selector of claim 13, further comprising:
a run-once command file remover to remove a visual representation of said command file from said ranked portion such that said command file is a non-candidate for execution, said removing occurring after a run-once command file is recognized as said run-once command file, selected for execution, and executed.

16. The command file selector of claim 10, further comprising:
a non-correlating command file rejecter to reject a non-correlating portion of said one or more command files, based on said comparing, wherein said non-correlating portion does not correlate with said one or more command file attributes.

17. The command file selector of claim 10, further comprising:
a security validator to validate said one or more command files before said accessing.

18. The command file selector of claim 10, wherein said first device is a memory storage configured to be received by a memory storage receiving port of said second device.

19. A non-transitory computer usable storage memory storing instructions that when executed by one or more processors cause a computer system to:
access one or more command files coupled with a first device, each command file of said one or more command files comprising one or more command file attributes;
access one or more device attributes associated with a second device;
compare said one or more command file attributes and said one or more device attributes to determine a correlation between said one or more command files and said second device; and
based on said comparing, assign one or more pre-determined values to one or more command file attributes associated with said each command file that correlates with said one or more device attributes; and
generate a precedence ranking value for each correlating command file by summing said one or more pre-determined values assigned to said each correlating command file.

20. The non-transitory computer usable storage memory of claim 19, further comprising:
selecting for execution a ranked command file of said ranked portion based on said precedence ranking value.

* * * * *